United States Patent
Chivite-Zabalza et al.

(10) Patent No.: US 12,143,029 B2
(45) Date of Patent: Nov. 12, 2024

(54) ELECTRICAL ASSEMBLY FOR HIGH VOLTAGE DIRECT CURRENT TRANSMISSION

(71) Applicant: General Electric Technology GmbH, Baden (CH)

(72) Inventors: Javier Chivite-Zabalza, Stafford (GB); John Outram, Stafford (GB); Colin Davidson, Stafford (GB)

(73) Assignee: GE INFRASTRUCTURE TECHNOLOGY LLC, Greenville, SC (US)

(*) Notice: Subject to any disclaimer, the term of this patent is extended or adjusted under 35 U.S.C. 154(b) by 226 days.

(21) Appl. No.: 17/801,878

(22) PCT Filed: Mar. 2, 2021

(86) PCT No.: PCT/EP2021/055186
§ 371 (c)(1),
(2) Date: Aug. 24, 2022

(87) PCT Pub. No.: WO2021/175856
PCT Pub. Date: Sep. 10, 2021

(65) Prior Publication Data
US 2023/0084187 A1   Mar. 16, 2023

(30) Foreign Application Priority Data
Mar. 4, 2020  (EP) ..................... 20275052

(51) Int. Cl.
*H02M 7/217*  (2006.01)
*H02J 3/36*   (2006.01)

(52) U.S. Cl.
CPC .............. *H02M 7/217* (2013.01); *H02J 3/36* (2013.01)

(58) Field of Classification Search
CPC .... H02M 3/1582; H02M 3/156; H02M 3/157; H02M 3/158; H02M 3/1584;
(Continued)

(56) References Cited

U.S. PATENT DOCUMENTS 11,152,868 B2 * 10/2021 Dallmer-Zerbe ..... H02M 7/483
11,404,973 B2 *  8/2022 Shi ......................... H02M 1/36
(Continued)

FOREIGN PATENT DOCUMENTS

CN  207753633 U  8/2018
EP    2913925 A1  9/2015

OTHER PUBLICATIONS

International Search Report and Written Opinion, dated May 6, 2021, 14 pages.

*Primary Examiner* — Jeffrey A Gblende
(74) *Attorney, Agent, or Firm* — Eversheds-Sutherland (US) LLP (57) ABSTRACT

An electrical assembly includes a number of modules, each module including at least one module switching element and at least one energy storage device, each module switching element and each energy storage device in each module arranged to be combinable to provide a voltage source, each module including a discharge circuit with a discharge switching element and a discharge resistor, each discharge switching element switchable to switch the corresponding discharge resistor into and out of the corresponding module, wherein the electrical assembly includes a controller configured to control the discharge switching elements to modulate the switching of each discharge resistor into and out of the corresponding module in a voltage balancing mode when the modules are in a blocked state so that each module emulates a resistive load profile to balance a distribution of
(Continued)

voltages between the modules, wherein the resistive load profile includes at least one positive resistive slope.

15 Claims, 8 Drawing Sheets

(58) Field of Classification Search
CPC .............. H02M 3/1586; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/08; H02M 3/1588; H02M 7/5395; H02M 1/14; H02M 1/0043; H02J 3/46; H02J 3/38

See application file for complete search history.

(56) References Cited

U.S. PATENT DOCUMENTS 11,463,016 B2 * 10/2022 Ying ................... H02M 7/4837
2019/0173393 A1 * 6/2019 Chivite Zabalza ... H02M 7/483

* cited by examiner

ELECTRICAL ASSEMBLY FOR HIGH VOLTAGE DIRECT CURRENT TRANSMISSION

CROSS-REFERENCE TO RELATED APPLICATIONS

This application is a U.S. National Stage Application under 35 U.S.C. § 371 and claims the priority benefit of International Application No. PCT/EP2021/055186, filed Mar. 2, 2021, which claims priority to European Application Ser. No. 20/275,052.7, filed Mar. 4, 2020, both of which are incorporated herein by reference.

TECHNICAL FIELD

This invention relates to an electrical assembly, preferably for use in high voltage direct current (HVDC) transmission.

BACKGROUND OF THE INVENTION

In HVDC power transmission networks alternating current (AC) power is typically converted to direct current (DC) power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance.

The conversion between DC power and AC power is utilized in power transmission networks where it is necessary to interconnect the DC and AC networks. In any such power transmission network, converters are required at each interface between AC and DC power to effect the required conversion from AC to DC or from DC to AC.

SUMMARY OF THE INVENTION

According to a first aspect of the invention, there is provided an electrical assembly comprising a plurality of modules, each module including at least one module switching element and at least one energy storage device, the or each module switching element and the or each energy storage device in each module arranged to be combinable to selectively provide a voltage source, each module including a discharge circuit, each discharge circuit including a discharge switching element and a discharge resistor, each discharge switching element switchable to switch the corresponding discharge resistor into and out of the corresponding module, wherein the electrical assembly includes a controller configured to selectively control the discharge switching elements to modulate the switching of each discharge resistor into and out of the corresponding module in a voltage balancing mode when the modules are in a blocked state so that each module emulates a resistive load profile to balance a distribution of voltages between the plurality of modules, wherein the resistive load profile includes at least one positive resistive slope.

Configuration of the modules in the blocked state may take place under certain operating conditions of the electrical assembly. When the modules are in the blocked state, the module switching elements are turned off and the modules behave as a passive circuit in which the distribution of voltages between the modules are governed by the impedances in the circuit.

If no further energy is supplied from an external circuit or network to the blocked modules, the energy storage devices are effectively cut off from the external circuit or network and will discharge their stored energy independently of each other. However, if energy continues to be supplied from an external circuit or network to the blocked modules, an unstable passive distribution of voltages between the modules can lead to a drift between the voltages of the modules over time. This in turn could cause some of the modules to power down and some of the other modules to take up a higher voltage share, which could trigger the associated overvoltage protection systems and thereby result in a cascaded failure of the modules that is likely to damage a large amount of the modules.

The emulation of the resistive load profile by each module through modulation of the switching of each discharge resistor into and out of the corresponding module ensures that, for each energy storage device, the current decreases as the voltage decreases and increases as the voltage increases, preferably as long as the voltage of the corresponding module is at or above a minimum voltage threshold at and above which the voltage balancing mode is enabled. This provides a voltage balancing effect that prevents the drift between the voltages of the modules over time and thereby ensures a stable distribution of voltages between the plurality of modules.

In embodiments of the invention, the controller may be configured to selectively control the discharge switching elements to modulate the switching of each discharge resistor into and out of the corresponding module in the voltage balancing mode so that each discharge resistor presents an emulated resistance that is higher than its actual resistance.

In further embodiments of the invention, the controller may be configured to selectively initiate the voltage balancing mode at the same time as the modules entering the blocked state In embodiments of the invention, the resistive load profile may include: a single positive resistive slope; a plurality of positive resistive slopes; or a combination of a plurality of positive resistive slopes and at least one discontinuity. When the resistive load profile includes multiple resistive slopes, the resistive slopes may be configured so that there is a continuity or discontinuity between consecutive resistive slopes. The discontinuity may be in the form of a negative resistive slope or a step change. When the resistive load profile includes multiple positive resistive slopes, each positive resistive slope may be identical to or different from the or each other positive resistive slope. When the resistive load profile includes multiple discontinuities, each discontinuity may be identical to or different from the or each other discontinuity. The number of resistive slopes may vary to provide a more optimised resistive load profile that is more suited to a particular configuration or application of the electrical assembly. For example, the resistive load profile may include a plurality of positive resistive slopes to balance a distribution of voltages between the plurality of modules and at the same time reduce the overall amount of power consumption by the discharge resistor.

In such embodiments the controller may be configured to selectively control the discharge switching elements to modulate the switching of each discharge resistor into and out of the corresponding module in the voltage balancing mode to initiate a transition of the resistive load profile between consecutive positive resistive slopes when the voltages of all of the modules are above a predefined minimum transition voltage. Initiating the transition of the resistive load profile between consecutive positive resistive slopes in this manner prevents the risk of accelerated drift between the voltages of the modules during the voltage balancing mode.

In still further embodiments of the invention, the controller may be configured to selectively control the discharge switching elements to modulate the switching of each discharge resistor into and out of the corresponding module in the voltage balancing mode so as to configure each resistive load profile to offset a negative impedance characteristic of one or more components of each module behaving as a constant power load. The constant power load behaviour of the or each such component (e.g. control electronics) of each module may be a result of a power supply of the or each such component drawing a current from the or each corresponding energy storage device in the same module while maintaining a constant voltage and power on one side of the power supply. Such a power supply may be a switched-mode power supply. As a result, when the voltage on the other side of the power supply falls, it draws more current, and vice versa. In this way the or each such component of each module behaves as a constant power load.

The constant power load behaviour by the or each such component of each module however can result in a drift between the voltages of the modules that as explained above could lead to a failure of one or more modules. By configuring the resistive load profile to offset the aforementioned negative impedance characteristic, the risk of drift between the voltages of the modules can be avoided.

Optionally the controller may be configured to selectively control the discharge switching elements to modulate the switching of each discharge resistor into and out of the corresponding module in the voltage balancing mode so as to configure each resistive load profile in accordance with a physical location of the corresponding module in the electrical assembly.

One or more environmental factors associated with the physical location of each module in the electrical assembly may exert an unbalancing effect on the distribution of voltages between the modules in the blocked state. Since each module has a fixed physical location in the electrical assembly, it becomes possible to predict the degree of unbalance between the voltages of the modules from their respective physical locations. Accordingly the compensation effect provided by each resistive load profile can be configured on the basis of the physical location of each module in the electrical assembly.

The resistance of a coolant inside a coolant system operatively associated with the plurality of modules may exert an unbalancing effect on the distribution of voltages between the modules in the blocked state. Hence, the electrical assembly may include at least one sensor for measuring a conductivity of a coolant operatively associated with each module in the electrical assembly, and the controller may be configured to selectively control the discharge switching elements to modulate the switching of each discharge resistor into and out of the corresponding module in the voltage balancing mode so as to configure each resistive load profile in accordance with a measured conductivity of the corresponding coolant.

The electrical assembly may be incorporated into a range of electrical apparatus. For example, a switching valve may comprise an electrical assembly according to any one of the embodiments described hereinabove, or a voltage source converter may comprise such a switching valve. The electrical assembly of the invention may be applied to any other apparatus that comprises a plurality of modules, each module including at least one module switching element and at least one energy storage device, the or each module switching element and the or each energy storage device in the or each module arranged to be combinable to selectively provide a voltage source. Examples of such an apparatus include a static synchronous compensator, a dynamic braking resistor and an electrical interruption device (such as an isolator, a disconnector or a circuit breaker).

According to a second aspect of the invention, there is provided a method of operating an electrical assembly comprising a plurality of modules, each module including at least one module switching element and at least one energy storage device, the or each module switching element and the or each energy storage device in each module arranged to be combinable to selectively provide a voltage source, each module including a discharge circuit, each discharge circuit including a discharge switching element and a discharge resistor, each discharge switching element switchable to switch the corresponding discharge resistor into and out of the corresponding module, wherein the method includes the step of selectively controlling the discharge switching elements to modulate the switching of each discharge resistor into and out of the corresponding module in a voltage balancing mode when the modules are in a blocked state so that each module emulates a resistive load profile to balance a distribution of voltages between the plurality of modules, wherein the resistive load profile includes at least one positive resistive slope.

The features and advantages of the electrical assembly of the first aspect of the invention and its embodiments apply mutatis mutandis to the method of the second aspect of the invention and its embodiments.

The method may include the step of selectively controlling the discharge switching elements to modulate the switching of each discharge resistor into and out of the corresponding module in the voltage balancing mode so that each discharge resistor presents an emulated resistance that is higher than its actual resistance.

The method may include the step of selectively initiating the voltage balancing mode at the same time as the modules entering the blocked state.

In the method of the invention, the resistive load profile may include: a single positive resistive slope; a plurality of positive resistive slopes; or a combination of a plurality of positive resistive slopes and at least one discontinuity.

When the resistive load profile includes multiple resistive slopes, the resistive slopes may be configured so that there is a continuity or discontinuity between consecutive resistive slopes.

When the resistive load profile includes a plurality of positive resistive slopes, the method may include the step of selectively controlling the discharge switching elements to modulate the switching of each discharge resistor into and out of the corresponding module in the voltage balancing mode to initiate a transition of the resistive load profile between consecutive positive resistive slopes when the voltages of all of the modules are above a predefined minimum transition voltage.

The method may include the step of selectively controlling the discharge switching elements to modulate the switching of each discharge resistor into and out of the corresponding module in the voltage balancing mode so as to configure each resistive load profile to offset a negative impedance characteristic of one or more components of each module behaving as a constant power load.

The method may include the step of selectively controlling the discharge switching elements to modulate the switching of each discharge resistor into and out of the corresponding module in the voltage balancing mode so as to configure each resistive load profile in accordance with a physical location of the corresponding module in the electrical assembly The method may include the steps of: measuring a conductivity of a coolant operatively associated with each module in the electrical assembly; and selectively controlling the discharge switching elements to modulate the switching of each discharge resistor into and out of the corresponding module in the voltage balancing mode so as to configure each resistive load profile in accordance with a measured conductivity of the corresponding coolant.

Each module may vary in configuration, non-limiting examples of which are set out as follows.

In a first exemplary configuration of a module, the or each module switching element and the or each energy storage device in the module may be arranged to be combinable to selectively provide a unidirectional voltage source. For example, the module may include a pair of module switching elements connected in parallel with an energy storage device in a half-bridge arrangement to define a 2-quadrant unipolar module that can provide zero or positive voltage and can conduct current in two directions.

In a second exemplary configuration of a module, the or each module switching element and the or each energy storage device in the module may be arranged to be combinable to selectively provide a bidirectional voltage source. For example, the module may include two pairs of module switching elements connected in parallel with an energy storage device in a full-bridge arrangement to define a 4-quadrant bipolar module that can provide negative, zero or positive voltage and can conduct current in two directions.

The plurality of modules may be connected in series to define a chain-link converter. The structure of the chain-link converter permits build-up of a combined voltage across the chain-link converter, which is higher than the voltage available from each of its individual modules, via the insertion of the energy storage devices of multiple modules, each providing its own voltage, into the chain-link converter. In this manner switching of the or each module switching element in each module causes the chain-link converter to provide a stepped variable voltage source, which permits the generation of a voltage waveform across the chain-link converter using a step-wise approximation. As such the chain-link converter is capable of providing a wide range of complex voltage waveforms.

At least one switching element may be a wide-bandgap material based switching element or a silicon semiconductor based switching element. Examples of wide-bandgap materials include, but are not limited to, silicon carbide, boron nitride, gallium nitride and aluminium nitride.

At least one switching element may include at least one self-commutated switching device. The or each self-commutated switching device may be an insulated gate bipolar transistor (IGBT), a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated switching device. The number of switching devices in each switching element may vary depending on the required voltage and current ratings of that switching element.

At least one switching element may further include a passive current check element that is connected in anti-parallel with the or each switching device. The or each passive current check element may include at least one passive current check device. The or each passive current check device may be any device that is capable of limiting current flow in only one direction, e.g. a diode. The number of passive current check devices in each passive current check element may vary depending on the required voltage and current ratings of that passive current check element.

Each energy storage device may be any device that is capable of storing and releasing energy to selectively provide a voltage, e.g. a capacitor, fuel cell or battery.

The configuration of the voltage source converter may vary depending on its operating requirements.

In embodiments of the invention, the voltage source converter may include at least one converter limb and a plurality of modules, the or each converter limb comprising an electrical assembly according to any one of the embodiments described hereinabove, the or each converter limb extending between first and second DC terminals, the or each converter limb including first and second limb portions separated by an AC terminal, each limb portion including at least one of the modules.

In a preferred embodiment of the invention, the voltage source converter includes three converter limbs, each of which is connectable via the respective AC terminal to a respective phase of a three-phase AC network. It will be appreciated that the voltage source converter may include a different number of converter limbs, each of which is connectable via the respective AC terminal to a respective phase of an AC network with the corresponding number of phases.

It will be appreciated that the use of the terms "first" and "second", and the like, in this patent specification is merely intended to help distinguish between similar features (e.g. the first and second DC terminals, the first and second limb portions), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

A preferred embodiment of the invention will now be described, by way of a non-limiting example, with reference to the following drawings in which.

DETAILED DESCRIPTION

The figures are not necessarily to scale, and certain features and certain views of the figures may be shown exaggerated in scale or in schematic form in the interests of clarity and conciseness.

The following embodiment of the invention is used primarily in HVDC applications, but it will be appreciated that the following embodiment of the invention is applicable mutatis mutandis to other applications operating at different voltage levels. The following embodiment of the invention is described with reference to an AC-DC voltage source converter, but it will be appreciated that the following embodiment of the invention is applicable mutatis mutandis to other types of converters including AC-AC converters and DC-DC converters.

Figure 1:
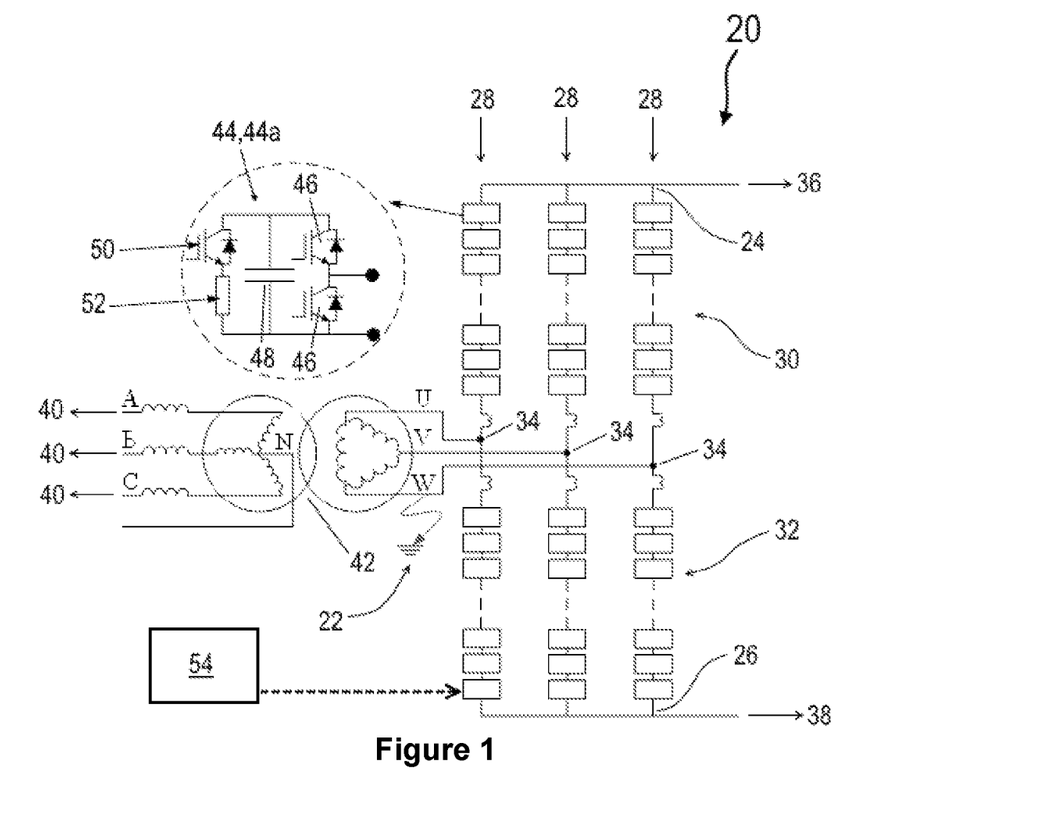
FIG. 1 shows a voltage source converter according to an embodiment of the invention.

An electrical assembly in the form of a voltage source converter according to an embodiment of the invention is shown in FIG. 1 and is designated generally by the reference numeral 20.

The voltage source converter 20 includes first and second DC terminals 24,26 and a plurality of converter limbs 28. Each converter limb 28 extends between the first and second DC terminals 24,26 and includes first and second limb portions 30,32 separated by a respective AC terminal 34. In each converter limb 28, the first limb portion 30 extends between the first DC terminal 24 and the AC terminal 34, while the second limb portion 32 extends between the second DC terminal 26 and the AC terminal 34.

In use, the first and second DC terminals 24,26 of the voltage source converter 20 are respectively connected to a DC network 36,38. In use, the AC terminal 34 of each converter limb 28 of the voltage source converter 20 is connected to a respective AC phase of a three-phase AC network 40 via a star-delta transformer arrangement 42. It is envisaged that in other embodiments of the invention the transformer arrangement 42 may be a star-star transformer arrangement, may be another type of transformer arrangement or may be omitted altogether. The three-phase AC network 40 is an AC power grid 40.

Each limb portion 30,32 includes a switching valve, which includes a chain-link converter that is defined by a plurality of series-connected modules 44.

Each module 44 may vary in topology, examples of which are described as follows.

Figure 2:
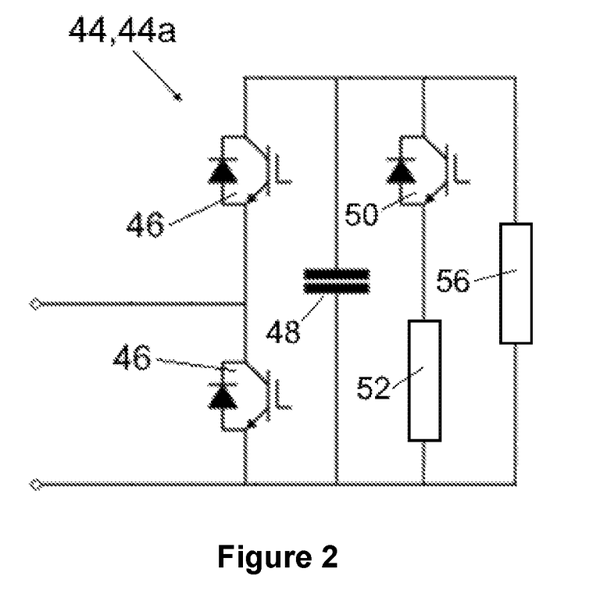
FIGS. 2 and 3 respectively show exemplary half-bridge and full-bridge chain-link module configurations of a module of the voltage source converter of FIG. 1.

FIGS. 1 and 2 show schematically the structure of an exemplary module 44 in the form of a half-bridge module 44a. The half-bridge module 44a includes a pair of module switching elements 46 and a capacitor 48. Each module switching element 46 of the half-bridge module 44a is in the form of an IGBT which is connected in parallel with an anti-parallel diode. The pair of module switching elements 46 are connected in parallel with the capacitor 48 in a half-bridge arrangement to define a 2-quadrant unipolar module 44a that can provide zero or positive voltage and can conduct current in both directions.

Figure 3:
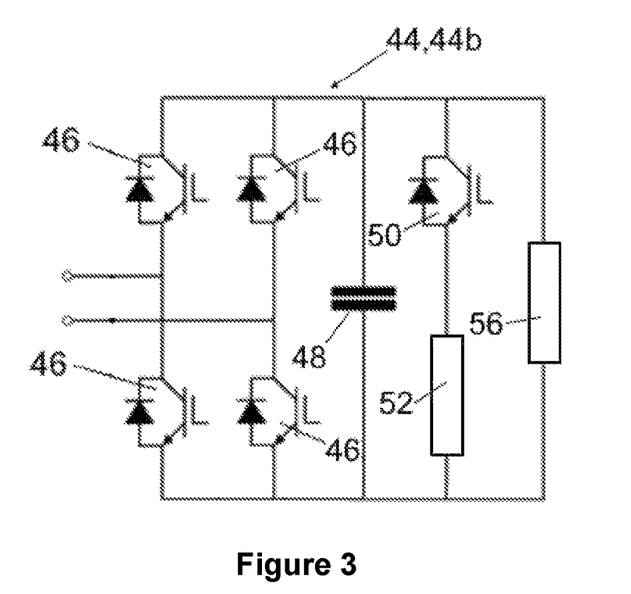

FIG. 3 shows schematically the structure of an exemplary module 44 in the form of a full-bridge module 44b. The full-bridge module 44b includes two pairs of module switching elements 46 and a capacitor 48. Each module switching element 46 of the full-bridge module 44b is in the form of an IGBT which is connected in parallel with an anti-parallel diode. The pairs of module switching elements 46 are connected in parallel with the capacitor 48 in a full-bridge arrangement to define a 4-quadrant bipolar module 44b that can provide negative, zero or positive voltage and can conduct current in both directions.

The structure of a given module 44 includes the arrangement and type of module switching elements 46 and energy storage device 48 used in the given module 44. It will be appreciated that it is not essential for all of the modules 44 to have the same module structure. For example, the plurality of modules 44 may comprise a combination of half-bridge modules 44a and full-bridge modules 44b.

It is envisaged that, in other embodiments of the invention, each module switching element 46 of each module 44 may be replaced by a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated semiconductor device. It is also envisaged that, in other embodiments of the invention, each diode may be replaced by a plurality of series-connected diodes.

The capacitor 48 of each module 44 is selectively bypassed or inserted into the corresponding chain-link converter by changing the states of the module switching elements 46. This selectively directs current through the capacitor 48 or causes current to bypass the capacitor 48, so that the module 44 provides a zero or non-zero voltage.

The capacitor 48 of the module 44 is bypassed when the module switching elements 46 in the module 44 are configured to form a short circuit in the module 44, whereby the short circuit bypasses the capacitor 48. This causes current in the corresponding chain-link converter to pass through the short circuit and bypass the capacitor 48, and so the module 44 provides a zero voltage, i.e. the module 44 is configured in a bypassed mode.

The capacitor 48 of the module 44 is inserted into the corresponding chain-link converter when the module switching elements 46 in the module 44 are configured to allow the current in the corresponding chain-link converter to flow into and out of the capacitor 48. The capacitor 48 then charges or discharges its stored energy so as to provide a non-zero voltage, i.e. the module 44 is configured in a non-bypassed mode.

In this manner the module switching elements 46 in each module 44 are switchable to control flow of current through the corresponding capacitor 48.

It is possible to build up a combined voltage across each chain-link converter, which is higher than the voltage available from each of its individual modules 44, via the insertion of the capacitors of multiple modules 44, each providing its own voltage, into each chain-link converter. In this manner switching of the module switching elements 46 in each module 44 causes each chain-link converter to provide a stepped variable voltage source, which permits the generation of a voltage waveform across each chain-link converter using a step-wise approximation. Hence, the module switching elements 46 in each limb portion 30,32 are switchable to selectively permit and inhibit flow of current through the corresponding capacitor 48 in order to control a voltage across the corresponding limb portion 30,32.

It is envisaged that, in other embodiments of the invention, each module 44 may be replaced by another type of module which includes at least one module switching element and at least one energy storage device, the or each module switching element and the or each energy storage device in each such module arranged to be combinable to selectively provide a voltage source.

It is also envisaged that, in other embodiments of the invention, the capacitor 48 in each module 44 may be replaced by another type of energy storage device which is capable of storing and releasing energy to provide a voltage, e.g. a battery or a fuel cell.

Each module 44 further includes a discharge circuit in the form of a series connection of a discharge switching element 50 and a discharge resistor 52. In each module 44, the series connection of the discharge switching element 50 and the discharge resistor 52 is connected in parallel with the capacitor 48 such that the discharge switching element 50 is switchable to switch the discharge resistor 52 into and out of the module 44. Each discharge circuit may be used to provide the corresponding module 44 with a rapid discharge capability.

It is envisaged that, in other embodiments of the invention, the discharge switching element and the discharge resistor may be arranged differently in the discharge circuit. It is also envisaged that, in still other embodiments of the invention, the discharge circuit may include a different number of discharge switching elements and/or a different number of discharge resistors.

The voltage source converter further includes a controller 54 configured, e.g. programmed, to control the switching of the module switching elements 46 and the discharge switching elements 50.

For the purposes of simplicity, the controller 54 is exemplarily described with reference to its implementation as a single control unit. In other embodiments, the controller 54 may be implemented as a plurality of control units. The configuration of the controller 54 may vary depending on specific requirements of the voltage source converter 20. For example, the controller 54 may include a plurality of control units, each of which is configured to control the switching of the module switching elements 46 of a respective one of the modules 44. Each control unit may be configured to be internal to, or external of, the corresponding module 44. Alternatively, the controller may include a combination of one or more control units internal to the corresponding module 44 and one or more control units external of the corresponding module 44. Each control unit may be configured to communicate with at least one other control unit via telecommunications links.

Each module 44 further includes a bleed resistor 56 connected in parallel with the capacitor 48 and the discharge circuit. In each module 44, the bleed resistor 56 typically has a higher ohmic value than the discharge resistor 52. For example, in each module 44, the bleed resistor 56 typically has an ohmic value of hundreds of kΩ while the discharge resistor 52 has an ohmic value that ranges from a few Ω to a few kΩ. Preferably the discharge resistor 52 has an ohmic value that enables it to draw a current that is comparable to the load current of the voltage source converter 20 itself which may be in the range of 1000 A to 2000 A. This enables the discharge resistor 52 to be used for rapid discharging.

Operation of the voltage source converter 20 is described as follows with reference to FIGS. 4 to 14.

In order to transfer power between the DC and AC networks 36,38,40, the controller 54 controls the switching of the module switching elements 46 of the modules 44 to switch the capacitors 48 of the respective limb portions 30,32 into and out of circuit between the respective DC and AC terminals 24,26,34 to interconnect the DC and AC networks 36,38,40. The controller 54 switches the module switching elements 46 of the modules 44 of each limb portion 30,32 to provide a stepped variable voltage source between the respective DC and AC terminals 24,26,34 and thereby generate a voltage waveform so as to control the configuration of an AC voltage waveform at the corresponding AC terminal 34 to facilitate the transfer of power between the DC and AC networks 36,38,40.

During normal operation of the voltage source converter 20, the modules 44 are operated in a deblocked state in which the module switching elements 46 are switched to maintain a balanced distribution of the voltages between the modules 44 over each power cycle.

Figure 4:
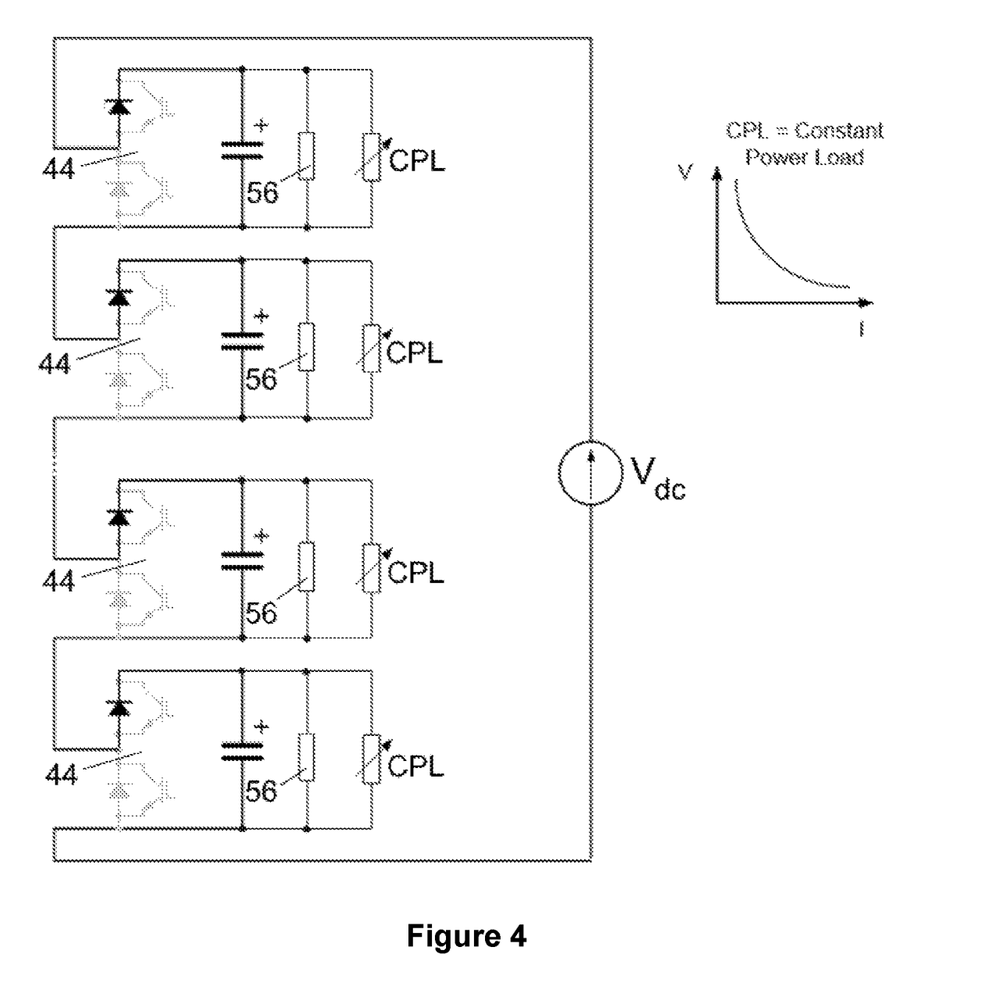
FIG. 4 shows an exemplary representation of a converter limb with its modules in a blocked state.

Each module 44 may be switched to a blocked state in which the module switching elements 46 are turned off and each module 44 behaves as a passive circuit in which the distribution of the voltages between the modules 44 are governed by the impedances in the circuit. FIG. 4 shows an exemplary representation of a converter limb 28 with its modules 44 in a blocked state, with a DC voltage applied across the modules 44.

The configuration of the modules 44 in the blocked state may take place for a short period, typically a few seconds, at start-up of the voltage source converter 20 during which energy is supplied to the voltage source converter 20 from the DC network 36,38 or the AC network 40 in order to pre-charge the capacitors 48. The configuration of the modules 44 in the blocked state may also take place during shut-down of the voltage source converter 20 in which the capacitors 48 slowly discharge, typically over the course of a few minutes. During the shut-down of the voltage source converter 20, no further energy is supplied from the DC network 36,38 or the AC network 40 to the blocked modules 44, which results in the capacitors 48 being effectively cut off from the DC and AC networks 36,38,40 and discharging their stored energy independently of each other.

Figure 5:
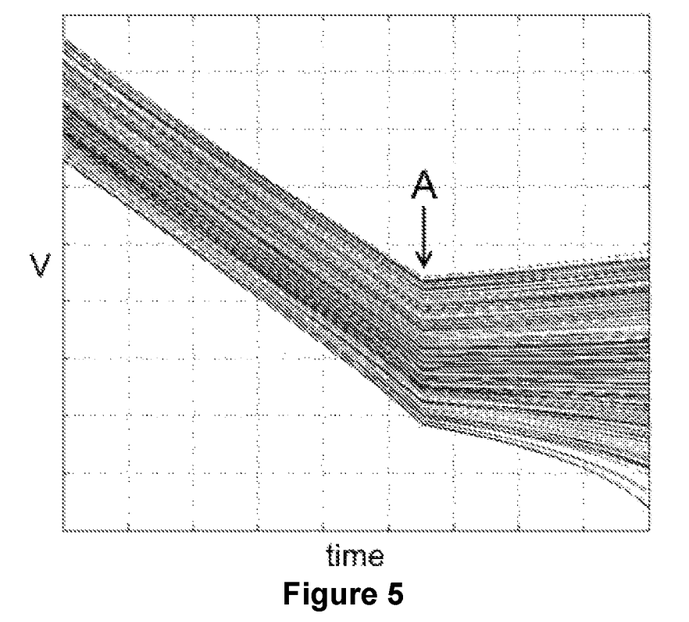
FIG. 5 shows a time variation of the voltages of the modules of FIG. 4.

In the event that the modules 44 are in a blocked state and energy continues to be supplied from the DC network 36,38, the AC network 40 or both networks 36,38,40 to the blocked modules 44, an unstable passive distribution of voltages between the modules 44 can lead to a drift between the voltages of the modules 44 over time, as shown in FIG. 5. Starting from the left-hand side of the graph in FIG. 5, the sum of the voltages of the modules 44 in the voltage source converter 20 exceeds the voltage applied to the voltage source converter 20 from the DC and/or AC networks 36,38,40, which means that energy is not supplied from the DC and/or AC networks 36,38,40 to the blocked modules 44. As a result, the capacitors 48 of the modules 44 all discharge independently at essentially the same rate. At the point in time indicated by 'A' in FIG. 5, the sum of the voltages of the modules 44 in the voltage source converter 20 falls below the voltage applied to the voltage source converter 20 from the DC and/or AC networks 36,38,40, which means that energy is now fed from the DC and/or AC networks 36,38,40 to the blocked modules 44. Thereafter, the voltages of the modules 44 begin to diverge, thus resulting in imbalance between the voltages of the modules 44. This in turn could cause some of the modules 44 to power down and some of the other modules 44 to take up a higher voltage share, which could trigger the associated overvoltage protection systems and thereby result in a cascaded failure of the modules 44 that is likely to damage a large amount of the modules 44.

The risk of drift between the voltages of the blocked modules 44 over time may be overlooked during normal operation of point-to-point HVDC power transmission schemes because energy is supplied to the blocked modules 44 for only a few seconds during start-up of the voltage source converter 20 and because the comparatively large size of the capacitors 48 means that the divergence between the voltages of the blocked modules 44 can take several minutes to appear. However, there may be certain normal and fault operating conditions of the voltage source converter 20 that may require the modules 44 to be in a blocked state and connected to the DC network 36,38, the AC network 40 or both networks 36,38,40 for a prolonged or indefinite period of time.

The drift between the voltages of the blocked modules 44 over time may arise as a result of the control electronics of the blocked modules 44 behaving as a constant power load CPL. Specifically, in each module 44, the control electronics behave as a constant power load CPL as a result of a switched-mode power supply of the control electronics drawing a current from the corresponding capacitor 48. A high-voltage side of the switched-mode power supply is connected to the corresponding capacitor 48. The switched-mode power supply naturally tries to maintain a constant voltage and power on its low-voltage side. As a result, when the voltage on the high-voltage side of the power supply falls, it draws more current, and when the voltage on the high-voltage side of the power supply rises, it draws less current. Hence, the switched-mode power supply draws a higher current as the voltage of the corresponding capacitor 48 decreases and the switched-mode power supply draws a lower current as the voltage of the corresponding capacitor 48 increases. This results in the control electronics of each module 44 having a negative impedance characteristic that in turn causes the drift between the voltages of the blocked modules 44 due to the supply of energy from the DC network 36,38, the AC network 40 or both networks 36,38, 40. At a certain voltage of the capacitor 48, the constant power load CPL disappears as a result of the control electronics powering down due to the switched-mode power supply only working at or above a certain minimum voltage of the capacitor 48.

The risk of drift between the voltages of the modules 44 can be avoided by enabling each blocked module 44 to change its load profile by emulating a resistive load profile that offsets the negative impedance characteristic of the control electronics of each blocked module 44 behaving as a constant power load. The resistive load profile of each module 44 may be emulated through the switching of the discharge switching elements 50 to modulate the switching of each discharge resistor 52 into and out of the corresponding module 44, preferably at a low duty ratio, in a voltage balancing mode so that each discharge resistor 52 presents an emulated resistance rRDR that is higher than its actual resistance $R_{RDR}$.

The modulation of the switching of each discharge resistor 52 into and out of the corresponding module 44 preferably involves fixing the on time $t_{ON}$ of the corresponding discharge switching element 50 and adjusting the modulation period T as required (e.g. to several tens of seconds) to obtain the desired emulated resistive load profile of each module 44. The on time $t_{ON}$ may be a few tens of μs, such as 100 μs, for an ohmic value of the discharge resistor 52 in the range of 1 Ω to 2Ω. The on time $t_{ON}$ will be correspondingly longer for larger ohmic values of the discharge resistor 52.

The demand reference current $i_{REF}$ for a given module 44 is given as:

$$i_{REF}=i_o+(v-v_o)/R_E \qquad (1)$$

Where $i_o$ is the initial current of the module 44 at the start of the voltage balancing mode, v is the instantaneous voltage of the module 44, $v_o$ is the minimum voltage threshold of the module 44 at and above which the voltage balancing mode is enabled and $R_E$ is the resistive slope of the emulated resistive load profile of the module 44.

The current $i_{RDR}$ of the discharge resistor 52 is calculated by taking away the load currents drawn by the bleed resistor 56 and the control electronics of the module 44 from the demand reference current $i_{REF}$ as follows:

$$i_{RDR}=i_o+(v-v_o)/R_E-v/R_B-P_Q/v \qquad (2)$$

Where the load current drawn by the bleed resistor 56 is given by $v/R_B$ and the load current drawn by the control electronics of the module 44 is given by $P_Q/v$.

The current $i_{RDR}$ of the discharge resistor 52 can never be negative, and equation (2) should be limited to 0 for $v<v_o$.

Since the emulated resistance rRDR of the discharge resistor 52 is given by $r_{RDR}=v/i_{RDR}$ and is obtained by choosing a suitable duty ratio d from $d=R_{RDR}/r_{RDR}$ and $d=t_{ON}/T$, the modulation period T is calculated as follows:

$$T = \frac{t_{ON}}{R_{RDR}} \frac{1}{i_{RDR}/v} \qquad (3)$$

$$T = \frac{t_{ON}}{R_{RDR}\left[\frac{1}{R_E}-\frac{1}{R_B}+\left(i_o-\frac{v_o}{R_E}-\frac{P_Q}{v}\right)/v\right]} \qquad (4)$$

Provided that the ohmic value of the discharge resistor 52 is sufficiently low (e.g. a few Ω), since the on time $t_{ON}$ of the discharge switching element 50 is significantly smaller than the modulation period T ($t_{ON}<<T$), the off time $t_{OFF}$ of the discharge switching element 50 may be assumed to be substantially the same as the modulation period T ($t_{OFF}\approx T$). The same assumption about the off time $t_{OFF}$ may or may not apply for larger ohmic values of the discharge resistor 52.

The calculation of the modulation period T may be enhanced by restricting its excursion between specified minimum and maximum values, e.g. through a firmware implementation. This is to prevent the execution of equation (4) resulting in an infinite number of values for T followed by a negative value.

Preferably the voltage balancing mode is configured so that it comes into effect as soon as the modules 44 enter the blocked state, more preferably at the same time as the modules 44 entering the blocked state. The voltage balancing mode preferably remains enabled at or above the minimum voltage threshold $v_o$ whenever the modules 44 are in the blocked state.

The minimum voltage threshold $v_o$ of each module 44 in the voltage balancing mode may be exemplarily defined by $$v_o < \frac{V_{DC}}{2(N_{VSM})},$$

where $V_{DC}$ is the pole-to-pole DC voltage across the first and second DC terminals 24,26 of the voltage source converter 20 and $N_{VSM}$ is the number of modules in a given converter limb 28.

The minimum voltage threshold $v_o$ is preferably at least equal to the voltage at which the control electronics start up, i.e. above the voltage at which the control electronics of each module 44 powers down. More preferably, to reduce power consumption, the minimum voltage threshold $v_o$ may be higher than the voltage at which the control electronics start up so long as the voltages of the modules 44 will be above the minimum voltage threshold $v_o$ when the DC and/or AC networks 36,38,40 start to feed energy into the voltage source converter 20.

Optionally the minimum voltage threshold $v_o$ may be lower than the lowest possible voltage of each module 44 at the point where the DC and/or AC networks 36,38,40 start to feed energy into the voltage source converter 20 (as indicated by 'A' in FIG. 5). Although the voltage balancing mode will not have any balancing effect until the point in time at which the sum of the voltages of the modules 44 in the voltage source converter 20 falls below the voltage applied to the voltage source converter 20 from the DC and/or AC networks 36,38,40, initiating the voltage balancing mode prior to that point in time makes it easier to control the voltage balancing mode.

Figure 6:
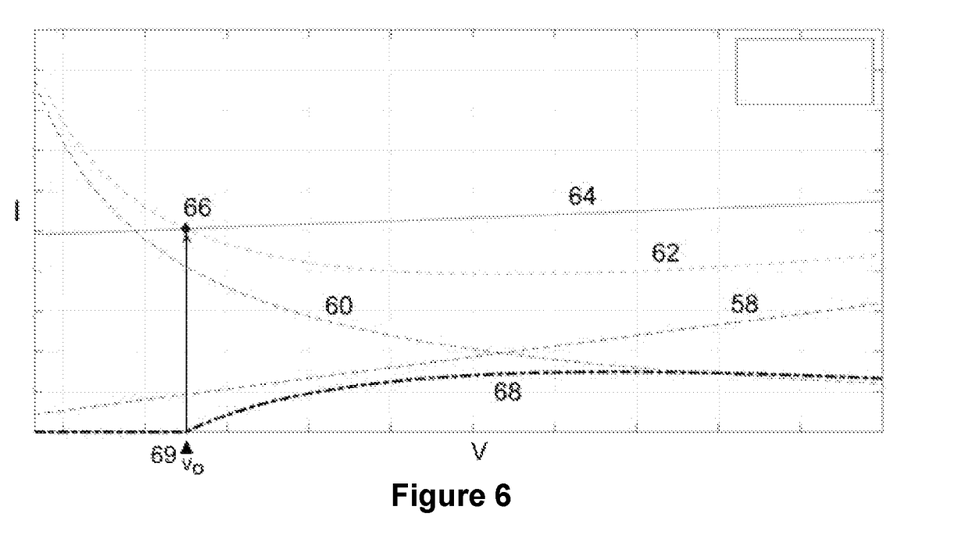
FIG. 6 illustrates the current loading of a given module in a blocked state when the module is configured to emulate a resistive load profile with a single positive resistive slope.

FIG. 6 illustrates the current loading of a given module 44 in the blocked state with capacitor voltage when the blocked module 44 is configured to emulate a resistive load profile. Dashed lines 58,60 respectively indicate the load currents drawn by the bleed resistor 56 and the control electronics of the module 44. Dashed line 62 indicates the sum of the load currents drawn by the bleed resistor 56 and the control electronics of the module 44. The emulated resistive load profile of the discharge resistor 52 is given by continuous line 64 and starts from the minimum voltage threshold $v_o$ indicated by the diamond marker 66. Dashed-dotted line 68 indicates the current $i_{RDR}$ of the discharge resistor 52. It will be appreciated that the x-axis of FIG. 6 has a suppressed zero, which is why the load current 58 drawn by the bleed resistor 58 is shown as having a non-zero value when it crosses the y-axis. The minimum voltage threshold $v_o$ is set to be the same as the start-up voltage of the control electronics, which is indicated by the triangle marker 69.

Figure 7:
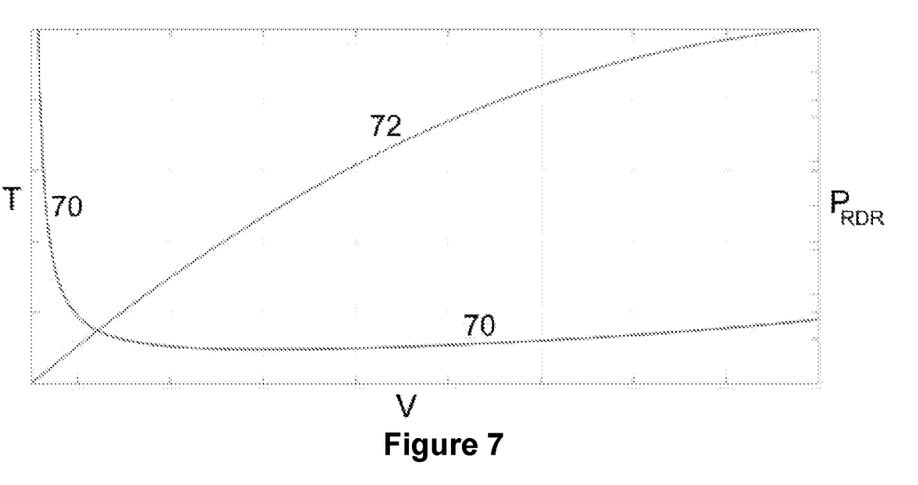
FIG. 7 illustrates a switching modulation period and an average dissipated power of a discharge resistor of a given module in a blocked state when the module is configured to emulate a resistive load profile with a single positive resistive slope.

FIG. 7 illustrates the modulation period T and the corresponding average dissipated power $P_{RDR}$ of the discharge resistor 52 with capacitor voltage when the blocked module 44 is configured to emulate a resistive load profile. The modulation period is indicated by line 70 and the corresponding dissipated power is indicated by line 72.

The average dissipated power $P_{RDR}$ of the discharge resistor 52 may be calculated as follows:

$$P_{RDR} = d \frac{v^2}{R_{RDR}} \quad (5)$$

where $d = R_{RDR} \frac{i_{RDR}}{v}$.

Preferably the value of the resistive slope $R_E$ of the emulated resistive load profile is chosen (e.g. to be in the range of 100 kΩ to 500 kΩ) to produce a slightly rising resistive slope. The value of the resistive slope $R_E$ may be adjusted to take into account a leakage resistance of cooling systems associated with the modules 44, as detailed later in this specification.

Figure 8:
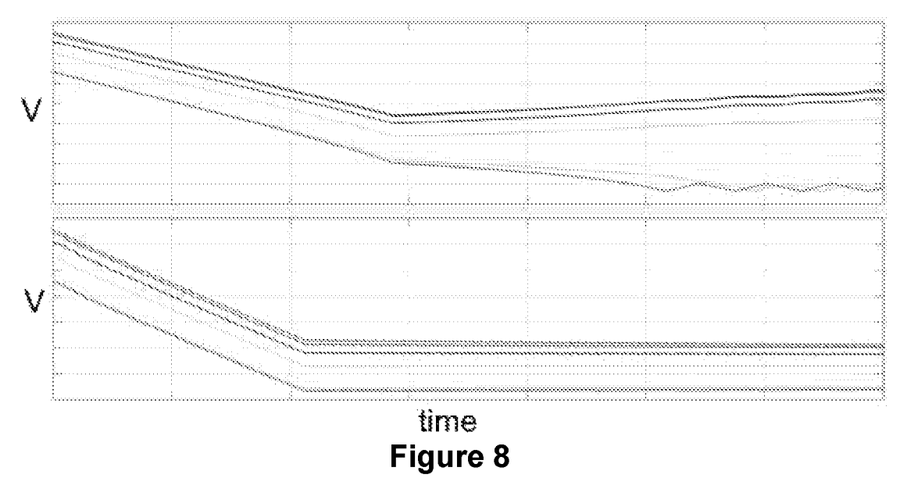
FIG. 8 illustrates a comparison of a time variation of the voltages of the modules of FIG. 4 with and without a compensation effect provided by emulated resistive load profiles.

The emulation of a resistive load profile by each blocked module 44 through modulation of the switching of each discharge resistor 52 into and out of the corresponding module 44 ensures that, for each capacitor 48, the current decreases as the voltage decreases and increases as the voltage increases as long as the voltage of the corresponding module 44 is at or above the minimum voltage threshold $v_o$ at and above which the voltage balancing mode is enabled. This provides a voltage balancing effect that prevents the drift between the voltages of the blocked modules 44, and thereby ensures a stable distribution of voltages between the blocked modules 44, over time. The top graph of FIG. 8 illustrates a drift between the voltages of the blocked modules 44 when the compensation effect of the emulated resistive load profiles is not applied, while the bottom graph of FIG. 8 illustrates a balancing of the voltages of the blocked modules 44 when the compensation effect of the emulated resistive load profiles is applied.

Optionally the emulated resistive load profile may include multiple resistive slopes. The number of resistive slopes may vary to provide a more optimised resistive load profile that is more suited to a particular configuration or application of the voltage source converter 20.

Figure 9:
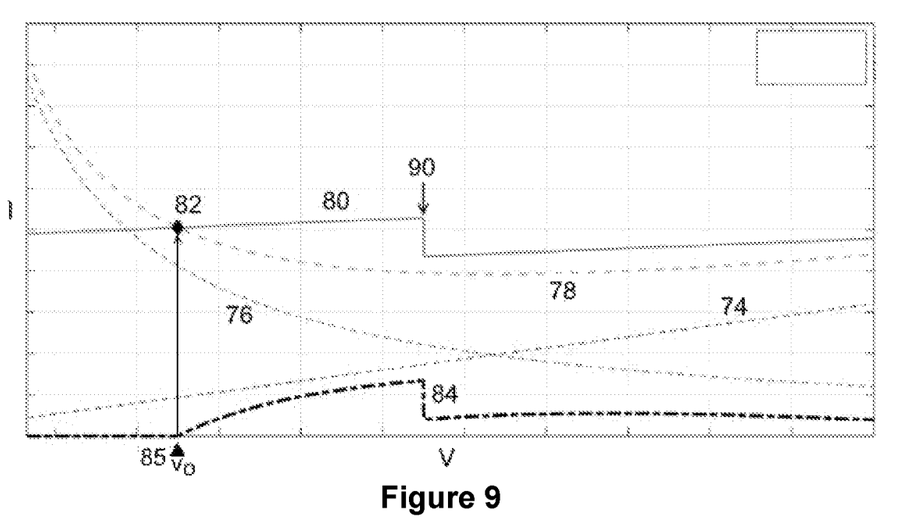
FIG. 9 illustrates the current loading of a given module in a blocked state when the module is configured to emulate a resistive load profile with multiple positive resistive slopes and a discontinuity.

FIG. 9 illustrates the current loading of a given module 44 in the blocked state with capacitor voltage when the blocked module 44 is configured to emulate a resistive load profile with two positive resistive slopes and a discontinuity therebetween. The discontinuity is arranged between the two positive resistive slopes so that the three slopes combine to define a discontinuous resistive slope. In the embodiment shown, the discontinuity is in the form of a step change but in other embodiments may instead be in the form of a negative resistive slope. Each positive resistive slope may be identical to or different from the other positive resistive slope. Dashed lines 74,76 respectively indicate the load currents drawn by the bleed resistor 56 and the control electronics of the module 44. Dashed line 78 indicates the sum of the load currents drawn by the bleed resistor 56 and the control electronics of the module 44. The emulated resistive load profile of the discharge resistor 52 is given by continuous line 80 and starts from the minimum voltage threshold $v_o$ indicated by the diamond marker 82. Dashed-dotted line 84 indicates the current $i_{RDR}$ of the discharge resistor 52. It will be appreciated that the x-axis of FIG. 9 has a suppressed zero, which is why the load current 74 drawn by the bleed resistor 58 is shown as having a non-zero value when it crosses the y-axis. The minimum voltage threshold $v_o$ is set to be the same as the start-up voltage of the control electronics, which is indicated by the triangle marker 85.

Figure 10:
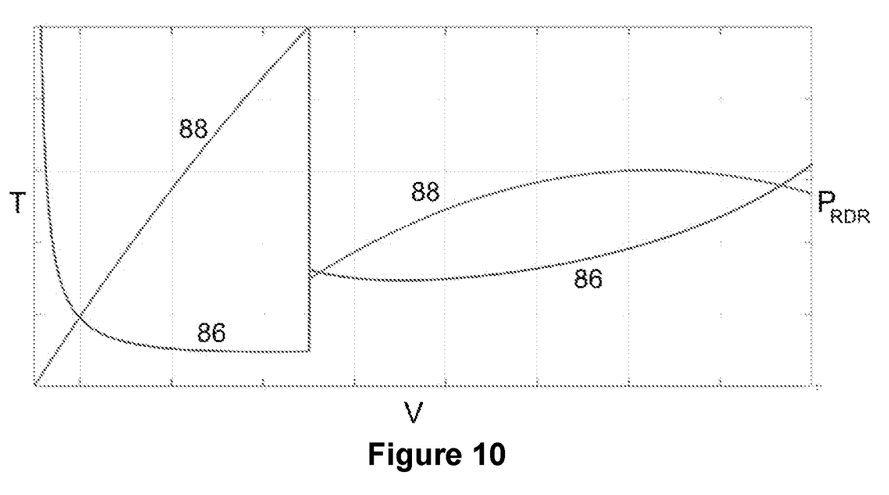
FIG. 10 illustrates a switching modulation period and an average dissipated power of a discharge resistor of a given module in a blocked state when the module is configured to emulate a resistive load profile with multiple positive resistive slopes and a discontinuity.

FIG. 10 illustrates the modulation period T and the corresponding average dissipated power $P_{RDR}$ of the discharge resistor 52 with capacitor voltage when the blocked module 44 is configured to emulate a resistive load profile with two positive resistive slopes and a discontinuity therebetween. The modulation period is indicated by line 86 and the corresponding dissipated power is indicated by line 88.

Each of the positive resistive slopes is calculated using two different off times $T_{OFF}$ using equation (4), which is based on two different calculations of the equivalent current in equation (1). The selection between the positive resistive slopes is dependent on the voltage of the capacitor 48 of the module 44 at a given point in time. The resistive load profile of FIG. 9 provides a balancing effect to the distribution of voltages between the blocked modules 44 and at the same time reduces the overall amount of power dissipation in each discharge resistor 52 when compared to the resistive load profile of FIG. 6. The point of transition between the positive resistive slopes may vary depending on the voltage balancing and power dissipation requirements of the blocked modules 44.

The controller 54 switches the discharge switching elements 50 to modulate the switching of each discharge resistor 52 into and out of the corresponding module 44 in the voltage balancing mode to initiate a transition of each resistive load profile between consecutive positive resistive slopes when the voltages of all of the modules 44 are above a predefined minimum transition voltage, taking into account any associated hysteresis. This is illustrated in FIG. 9 where the transition is represented by the discontinuity 90 between the consecutive positive resistive slopes. Initiating the transition of the resistive load profile between consecutive positive resistive slopes in this manner prevents the risk of accelerated drift between the voltages of the modules 44. On the contrary, if the voltage of one or more modules 44 is below the transition voltage at which the transition between consecutive positive resistive slopes is initiated, the voltage of the or each such module 44 will rapidly collapse towards zero. To ensure that the transition between consecutive positive resistive slopes is initiated only when the voltages of all of the modules 44 are above the transition voltage, the controller 54 must remain fully active and able to monitor the voltages of the capacitors 48 of all of the modules 44.

Figure 11:
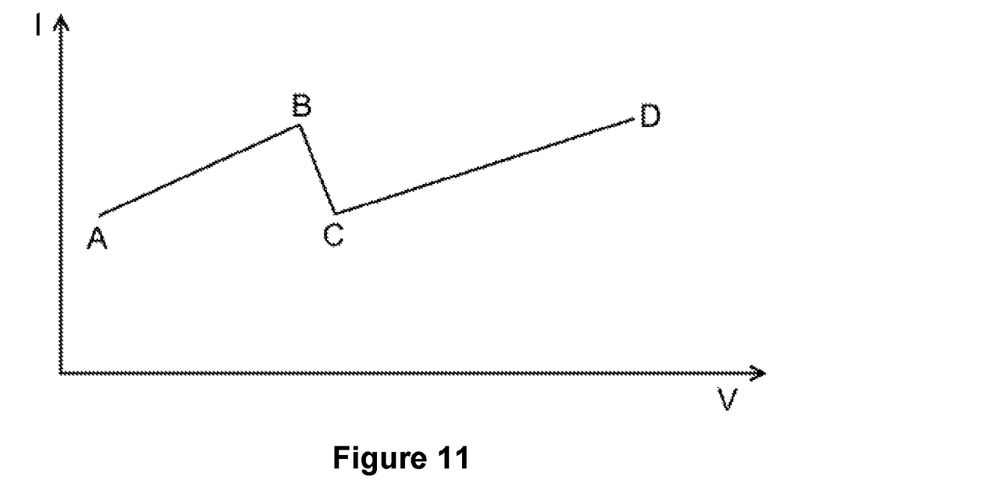
FIGS. 11 and 12 illustrate exemplary operating modes of a given module in a blocked state when the module is configured to emulate a resistive load profile with multiple positive resistive slopes and a discontinuity.
Figure 12:
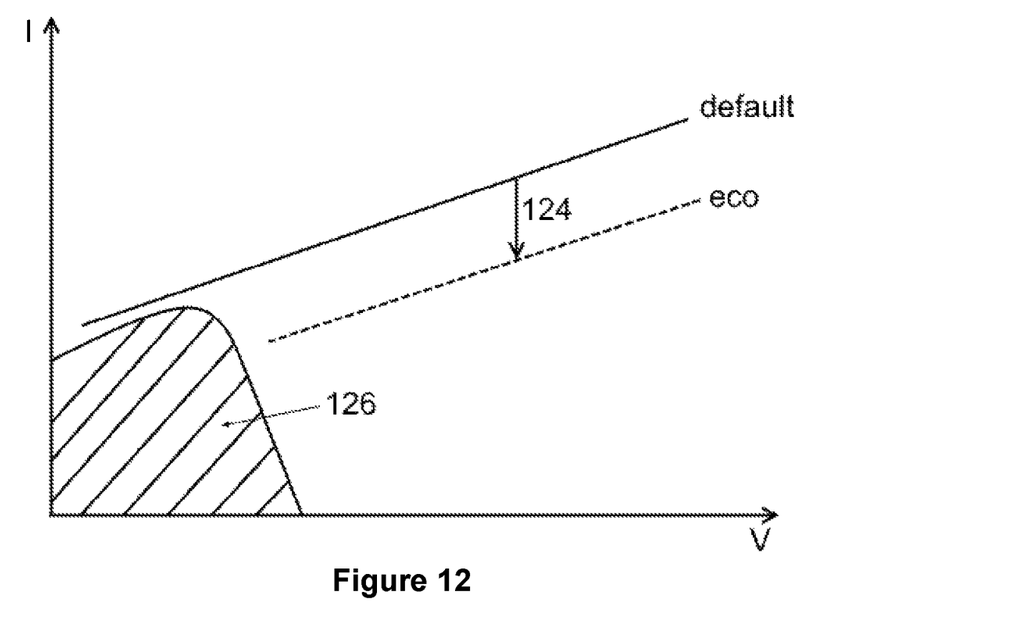

In embodiments of the invention employing a resistive load profile having multiple positive resistive slopes and at least one discontinuity (step change or negative resistive slope) therebetween, the controller 54 may be configured to operate the modules 44 in the following exemplary modes.

In an exemplary first mode shown in FIG. 11, each module 44 is configured to have a resistive load profile that includes two positive resistive slopes A-B and C-D that are connected via a negative resistive slope B-C. The negative resistive slope B-C in other embodiments may be replaced by a step change. Each of the regions A-B and C-D may consist of a single positive resistive slope or may consist of multiple positive resistive slopes without any discontinuity therebetween.

At the time when the modules 44 become reconnected to and therefore energised by the associated electrical networks 36,38,40, all modules 44 in a given switching valve are preferably either in the region A-B or in the region C-D, i.e. all modules 44 in a given switching valve are on the same side of the discontinuity. In a first case when the blocked modules 44 are energised by the AC network 40, the modules 44 are configured to be in the region C-D. In a second case when the blocked modules 44 are energised by the DC network 36,38, the modules 44 are configured to be in the region A-B. This is because the mean voltages to which the capacitors 48 settle down are different for the two cases. Typically the mean voltages to which the capacitors 48 settle down for the first AC-energised case is twice as high as the mean voltages to which the capacitors 44 settle down for the second DC-energised case.

The first mode therefore enables a given switching valve to autonomously carry out a voltage balancing mode, by configuring all of its modules 44 to follow the same resistive load profile, without requiring any input from a central control unit. The reliability of the autonomous voltage balancing mode by the switching valve can be improved through selection of a suitable position and suitable values of the discontinuity B-C in the resistive load profile.

In an exemplary second mode shown in FIG. 12, each module 44 is configured to have a "default" positive resistive slope and an "eco" positive resistive slope. The operation of each module 44 would normally start off with the "default" positive resistive slope. In the event the controller 54 identifies that all of the modules 44 are above a certain minimum level that corresponds to the level in which the constant power load starts to dominate the overall current consumption, the controller 54 may send a "gear change" command to all modules 44 to switch from the "default" positive resistive slope to the "eco" positive resistive slope, where the transition between the positive resistive slopes is in the form of a discontinuity 124. The region 126 in FIG. 12 indicates an unsafe operating region for each module 44.

Figure 13:
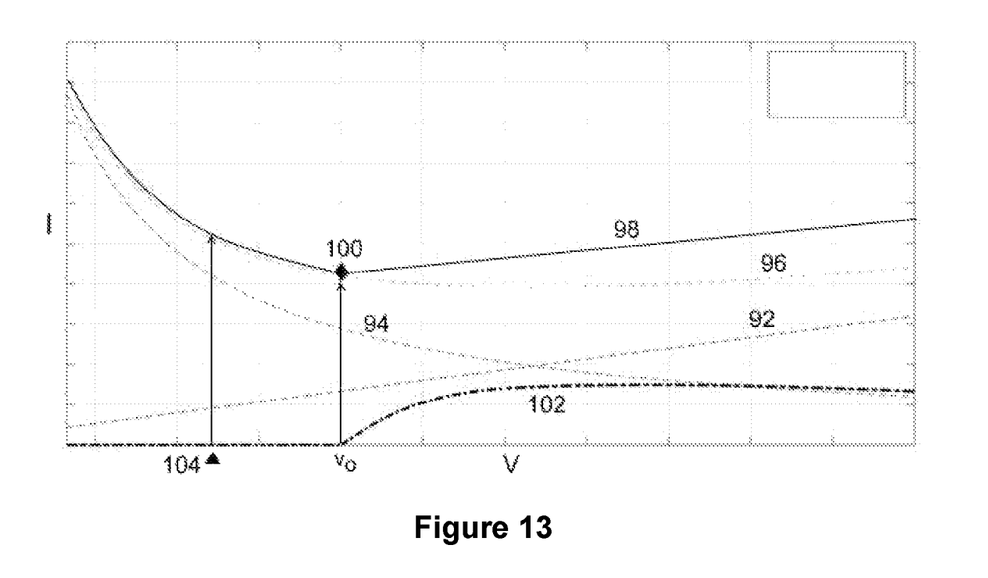
FIG. 13 illustrates the current loading of a given module in a blocked state when the module is configured to emulate a resistive load profile with a single positive resistive slope.

FIG. 13 illustrates the current loading of a given module 44 in the blocked state with capacitor voltage when the blocked module 44 is configured to emulate a resistive load profile with a single positive resistive slope. Dashed lines 92,94 respectively indicate the load currents drawn by the bleed resistor 56 and the control electronics of the module 44. Dashed line 96 indicates the sum of the load currents drawn by the bleed resistor 56 and the control electronics of the module 44. The emulated resistive load profile of the discharge resistor 52 is given by continuous line 98 and starts from the minimum voltage threshold $v_o$ indicated by the diamond marker 100. Dashed-dotted line 102 indicates the current $i_{RDR}$ of the discharge resistor 52. It will be appreciated that the x-axis of FIG. 13 has a suppressed zero, which is why the load current 92 drawn by the bleed resistor 58 is shown as having a non-zero value when it crosses the y-axis. The minimum voltage threshold $v_o$ is set to be higher than the start-up voltage of the control electronics, which is indicated by the triangle marker 104. As mentioned above, this approach has the benefit of reducing power consumption.

Figure 14:
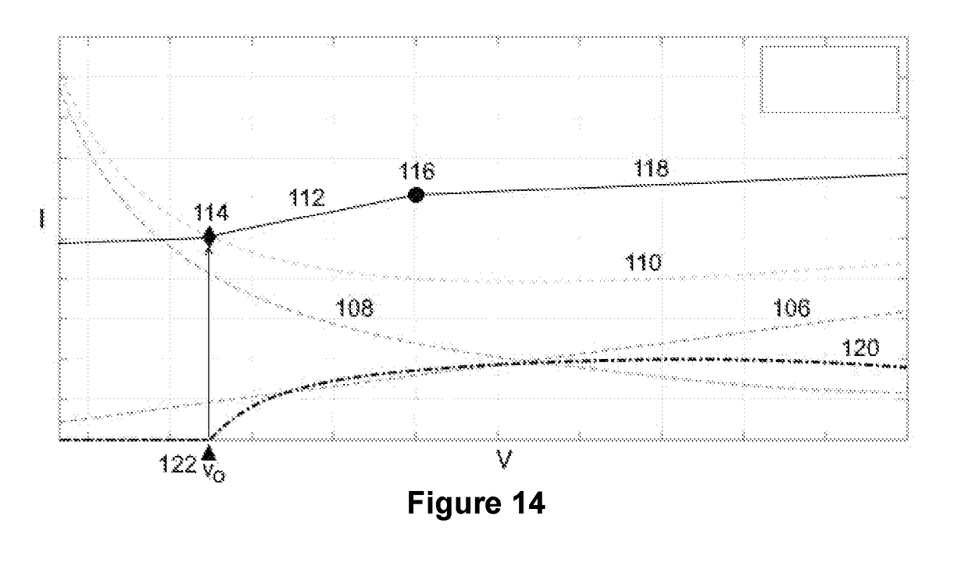
FIG. 14 illustrates the current loading of a given module in a blocked state when the module is configured to emulate a resistive load profile with multiple positive resistive slopes and no discontinuity.

FIG. 14 illustrates the current loading of a given module 44 in the blocked state with capacitor voltage when the blocked module 44 is configured to emulate a resistive load profile with two positive resistive slopes and no discontinuity therebetween. The two positive resistive slopes combine to define a continuous resistive slope. The first positive resistive slope is steeper than the second positive resistive slope. Dashed lines 106,108 respectively indicate the load currents drawn by the bleed resistor 56 and the control electronics of the module 44. Dashed line 110 indicates the sum of the load currents drawn by the bleed resistor 56 and the control electronics of the module 44. The first positive resistive slope of the emulated resistive load profile of the discharge resistor 52 is given by continuous line 112, and starts from the minimum voltage threshold $v_o$ indicated by the diamond marker 114 and ends at the transition voltage indicated by the circle marker 116. The second positive resistive slope of the emulated resistive load profile of the discharge resistor 52 is given by continuous line 118, and starts from the transition voltage indicated by the circle marker 116. Dashed-dotted line 120 indicates the current $i_{RDR}$ of the discharge resistor 52. It will be appreciated that the x-axis of FIG. 14 has a suppressed zero, which is why the load current 106 drawn by the bleed resistor 58 is shown as having a non-zero value when it crosses the y-axis. The minimum voltage threshold $v_o$ is set to the same as the start-up voltage of the control electronics, which is indicated by the triangle marker 122.

The configuration of the two positive resistive slopes 112,118 in the resistive load profile of FIG. 14 improves efficiency at higher voltages. It is envisaged that a control unit of each module 44 may be configured to autonomously control the corresponding module 44 to emulate such a resistive load profile without requiring a command from a central control unit.

In addition to or in place of the unbalancing effect introduced by the constant power load behaviour of the control electronics of the blocked modules 44, the resistance of a coolant inside a coolant system (such as coolant pipes) operatively associated with the modules 44 may exert an unbalancing effect on the distribution of voltages between the blocked modules 44, which could result in an undesirable drift between the voltages of the modules 44. Since each module 44 has a fixed physical location in the voltage source converter 20, it becomes possible to use their physical locations to predict the degree of unbalance between the voltages of the blocked modules 44 arising from leakage resistance. Thus, the resistive load profile of each module 44 can be adjusted on the basis of the physical location of each module 44 to provide a respective different degree of compensation for the leakage resistance associated with each module 44. Optionally, the voltage source converter 20 may include one or more sensors to measure a conductivity of the coolant and transmit the measured conductivity to the controller 54 and through use of the controller to configure each resistive load profile in accordance with the measured coolant conductivity.

If the controller 54 includes firmware to control the modulation of the switching of each discharge resistor 52 into and out of the corresponding module 44 in the voltage balancing mode, then a respective different firmware setting can be pre-loaded in the controller 54 for each module 44 to provide the aforementioned function of compensating for the leakage resistance associated with each module 44.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. An electrical assembly comprising a plurality of modules, each module including at least one module switching element and at least one energy storage device, the at least one module switching element and the at least one energy storage device in each module arranged to be combinable to selectively provide a voltage source, each module including a discharge circuit, each discharge circuit including a discharge switching element and a discharge resistor, each discharge switching element switchable to switch a corresponding discharge resistor into and out of a corresponding module, wherein the electrical assembly includes a controller configured to selectively control the discharge switching elements to modulate the switching of each discharge resistor into and out of the corresponding module in a voltage balancing mode when the modules are in a blocked state so that each module emulates a resistive load profile to balance a distribution of voltages between the plurality of modules, wherein the resistive load profile includes at least one positive resistive slope.

2. The electrical assembly according to claim 1, wherein the controller is configured to selectively control the discharge switching elements to modulate the switching of each discharge resistor into and out of the corresponding module in the voltage balancing mode so that each discharge resistor presents an emulated resistance that is higher than an actual resistance.

3. The electrical assembly according to claim 1, wherein the controller is configured to selectively initiate the voltage balancing mode at a same time as the modules entering the blocked state.

4. The electrical assembly according to claim 1, wherein the resistive load profile includes: a single positive resistive slope, a plurality of positive resistive slopes; or a combination of a plurality of positive resistive slopes and at least one discontinuity.

5. The electrical assembly according to claim 4, wherein the resistive load profile includes a plurality of resistive slopes that are configured so that there is a continuity or discontinuity between consecutive resistive slopes.

6. The electrical assembly according to claim 1, wherein the resistive load profile includes a plurality of positive resistive slopes, and the controller is configured to selectively control the discharge switching elements to modulate the switching of each discharge resistor into and out of the corresponding module in the voltage balancing mode to initiate a transition of the resistive load profile between consecutive positive resistive slopes when voltages of all of the modules are above a predefined minimum transition voltage.

7. The electrical assembly according to claim 1, wherein the controller is configured to selectively control the discharge switching elements to modulate the switching of each discharge resistor into and out of the corresponding module in the voltage balancing mode so as to configure each resistive load profile to offset a negative impedance characteristic of one or more components of each module behaving as a constant power load (CPL).

8. The electrical assembly according to claim 1, wherein the controller is configured to selectively control the discharge switching elements to modulate the switching of each discharge resistor into and out of the corresponding module in the voltage balancing mode so as to configure each resistive load profile in accordance with a physical location of the corresponding module in the electrical assembly.

9. The electrical assembly according to claim 1, including at least one sensor for measuring a conductivity of a coolant operatively associated with each module in the electrical assembly, wherein the controller is configured to selectively control the discharge switching elements to modulate the switching of each discharge resistor into and out of a corresponding module in the voltage balancing mode so as to configure each resistive load profile in accordance with a measured conductivity of the corresponding coolant.

10. A switching valve comprising the electrical assembly according to claim 1.

11. A voltage source converter comprising the switching valve according to claim 10.

12. A method of operating an electrical assembly comprising a plurality of modules, each module including at least one module switching element and at least one energy storage device, the at least one module switching element and the at least one energy storage device in each module arranged to be combinable to selectively provide a voltage source, each module including a discharge circuit, each discharge circuit including a discharge switching element and a discharge resistor, each discharge switching element switchable to switch a corresponding discharge resistor into and out of a corresponding module, wherein the method includes a step of selectively controlling the discharge switching elements to modulate the switching of each discharge resistor into and out of the corresponding module in a voltage balancing mode when the modules are in a blocked state so that each module emulates a resistive load profile to balance a distribution of voltages between the plurality of modules, wherein the resistive load profile includes at least one positive resistive slope.

13. The method according to claim 12, including the step of selectively controlling the discharge switching elements to modulate the switching of each discharge resistor into and out of the corresponding module in the voltage balancing mode so that each discharge resistor presents an emulated resistance that is higher than an actual resistance.

14. The method according to claim 12, including the step of selectively controlling the discharge switching elements to modulate the switching of each discharge resistor into and out of the corresponding module in the voltage balancing mode so as to configure each resistive load profile to offset a negative impedance characteristic of one or more components of each module behaving as a constant power load (CPL).

15. The method according to claim 12, including:
the step of selectively controlling the discharge switching elements to modulate the switching of each discharge resistor into and out of the corresponding module in the voltage balancing mode so as to configure each resistive load profile in accordance with a physical location of the corresponding module in the electrical assembly; and/or steps of: measuring a conductivity of a coolant operatively associated with each module in the electrical assembly; and selectively controlling the discharge switching elements to modulate the switching of each discharge resistor into and out of a corresponding module in the voltage balancing mode so as to configure each resistive load profile in accordance with a measured conductivity of the corresponding coolant.

* * * * *